US012647477B2

(12) United States Patent
Sivakumar et al.

(10) Patent No.: US 12,647,477 B2
(45) Date of Patent: Jun. 2, 2026

(54) DYNAMIC CONNECTION QUEUE DEPTH IN MULTI-SITE SYSTEMS

(71) Applicant: International Business Machines Corporation, Armonk, NY (US)

(72) Inventors: Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/153,432

(22) Filed: Jan. 12, 2023

(65) Prior Publication Data

US 2024/0244105 A1 Jul. 18, 2024

(51) Int. Cl.
*G06F 13/00* (2006.01)
*H04L 65/1069* (2022.01)
*H04L 67/1012* (2022.01)

(52) U.S. Cl.
CPC ...... *H04L 67/1012* (2013.01); *H04L 65/1069* (2013.01)

(58) Field of Classification Search
CPC . H04L 67/1012; H04L 65/1069; H04L 69/14; H04L 69/40; H04L 67/1008
USPC ................................. 709/228, 227, 201, 238
See application file for complete search history.

(56) References Cited

U.S. PATENT DOCUMENTS 8,621,074 B2 * 12/2013 Shikari ............... H04L 67/1001
                                                    710/33
8,868,730 B2 * 10/2014 Rossignoli .............. G06F 9/505
                                                    709/224

8,898,301 B2 * 11/2014 Shikari ............... H04L 67/1008
                                                    709/224
9,888,513 B2 * 2/2018 Iyer ........................ H04W 28/10
10,282,220 B2 * 5/2019 Koladi .................... G06F 9/455
10,342,060 B2 * 7/2019 Iyer ........................ H04W 28/10
11,252,232 B2 2/2022 Patel et al.
2012/0233309 A1 * 9/2012 Rossignoli ............. G06F 9/505
                                                    709/224

(Continued)

FOREIGN PATENT DOCUMENTS

KR            102403489 B1      5/2022

OTHER PUBLICATIONS

No Author, "Cloud Computing and Cloud Storage Architectures", https://web.archive.org/web/20170809174318/https://www.seagate. com/in/en/tech-insights/cloud-compute-and-cloud-storage-architecture-master-ti/, Aug. 9, 2017, 6 pages.

(Continued)

*Primary Examiner* — Kenneth R Coulter
(74) *Attorney, Agent, or Firm* — CANTOR COLBURN LLP; Tihon Poltavets

(57) ABSTRACT

Aspects of the invention include techniques for implementing a dynamic queue depth in a multi-site system. A non-limiting example method includes initiating an initiator of a multi-site system and initiating a target system of the multi-site system. The target system includes a preferred site and a non-preferred site. The method includes receiving, by the target system, a session creation request from the initiator. The session creation request targets the non-preferred site. In response to the session creation request targeting the non-preferred site, a queue depth allocator of the multi-site system allocates a minimum queue depth to a path between the initiator and the non-preferred site.

20 Claims, 4 Drawing Sheets

(56) References Cited

U.S. PATENT DOCUMENTS

| 2017/0083252 | A1 | | 3/2017 | Singh et al. |
| 2017/0134310 | A1 | * | 5/2017 | Koladi ................. G06F 9/4411 |
| 2021/0263676 | A1 | | 8/2021 | Patel et al. |
| 2021/0266361 | A1 | * | 8/2021 | Patel ................... H04L 67/1097 |
| 2022/0066957 | A1 | | 3/2022 | Patel et al. |

OTHER PUBLICATIONS

Guo, et al, "Dynamic Performance Optimization for Cloud Computing Using M/M/m Queueing System", Journal of Applied Mathematics, 2014, pp. 1-8.

* cited by examiner

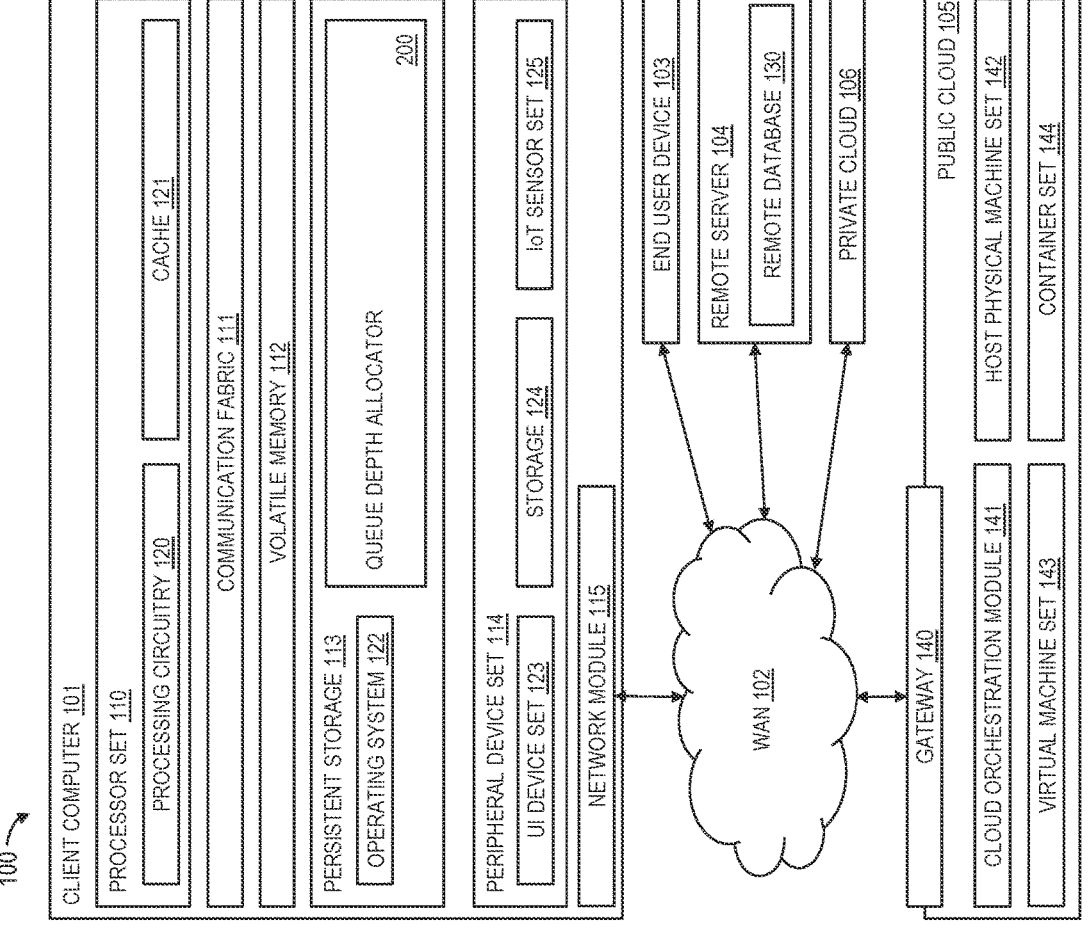

CLIENT COMPUTER 101

PROCESSOR SET 110

PROCESSING CIRCUITRY 120    CACHE 121

COMMUNICATION FABRIC 111

VOLATILE MEMORY 112

QUEUE DEPTH ALLOCATOR    200

PERSISTENT STORAGE 113

OPERATING SYSTEM 122

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

Host / Application Initiator

Update Depth to Secondary Site

Out-of-Band
API Instance

Update SUCCESS

Network Fabric 210

Depth Update
REQ/RESP

Clustering Layer 224

206

1  2  3  4

CPU Cores 214

1  2  3  4

CPU Cores 220

208

VM Instances 216

VM Instances (DR location) 222

Site 1 (Preferred) Nodes 212

Site 2 (Non-Preferred) Nodes 218

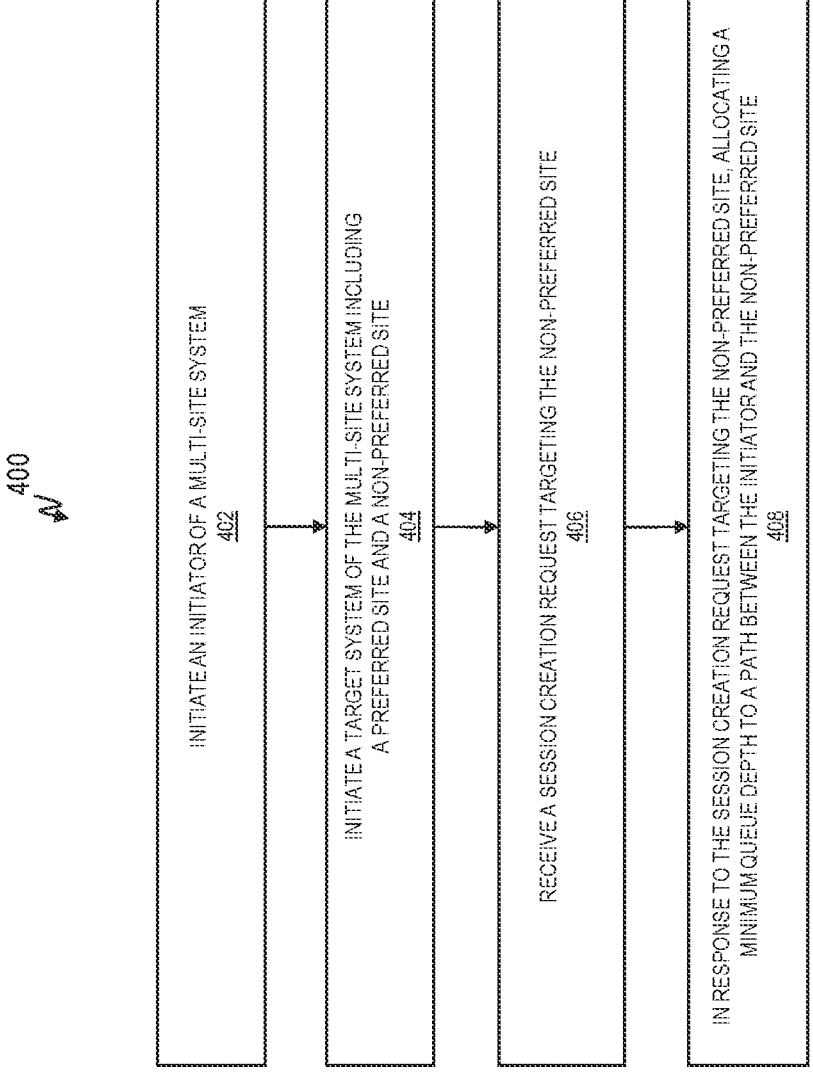

400

INITIATE AN INITIATOR OF A MULTI-SITE SYSTEM
402

INITIATE A TARGET SYSTEM OF THE MULTI-SITE SYSTEM INCLUDING
A PREFERRED SITE AND A NON-PREFERRED SITE
404

RECEIVE A SESSION CREATION REQUEST TARGETING THE NON-PREFERRED SITE
406

IN RESPONSE TO THE SESSION CREATION REQUEST TARGETING THE NON-PREFERRED SITE, ALLOCATING A
MINIMUM QUEUE DEPTH TO A PATH BETWEEN THE INITIATOR AND THE NON-PREFERRED SITE
408

FIG. 4

DYNAMIC CONNECTION QUEUE DEPTH IN MULTI-SITE SYSTEMS

BACKGROUND

The present invention generally relates to cloud computing and cloud storage, and more specifically, to computer systems, computer-implemented methods, and computer program products for dynamically allocating connection queue depth in multi-site systems.

Cloud computing and cloud storage have become the preferred method for delivering information and online functionality. While some cloud services focus on providing consumers with a broad range of services and functionalities, including e-tail shopping, research, social media networking, entertainment consumption, and protecting important digital documents, other cloud services focus on small businesses, large enterprises, governments, and other institutions. Various cloud services provide public cloud storage and processing capability to consumers at no charge, while others charge some type of subscription-based fee. There are also private clouds that are owned and controlled by an organization, providing a secure network for sharing critical software and data. For example, hospitals can choose to use public archiving services for electronic medical records and patient image data (using, e.g., PACS), or they can create their own cloud archive solution.

Software as a Service (SaaS) cloud solutions include file, document, music, photo and video sharing, backup/restore, and disaster recovery, along with archiving capabilities. Other cloud computing options include database, big data analytics (e.g., map-reduce based services), cloud drives, and other applications exploiting back-end cloud storage. These cloud solutions also extend to products and solutions used for deploying public, private, and hybrid clouds.

SUMMARY

Embodiments of the present invention are directed to techniques for implementing a dynamic queue depth in a multi-site system. A non-limiting example method includes initiating an initiator of a multi-site system and initiating a target system of the multi-site system. The target system includes a preferred site and a non-preferred site. The method includes receiving, by the target system, a session creation request from the initiator. The session creation request targets the non-preferred site. In response to the session creation request targeting the non-preferred site, a queue depth allocator of the multi-site system allocates a minimum queue depth to a path between the initiator and the non-preferred site.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a block diagram of an example computing environment for use in conjunction with one or more embodiments of the present invention;

FIG. 4 is a flowchart in accordance with one or more embodiments of the present invention.

Figure 2:
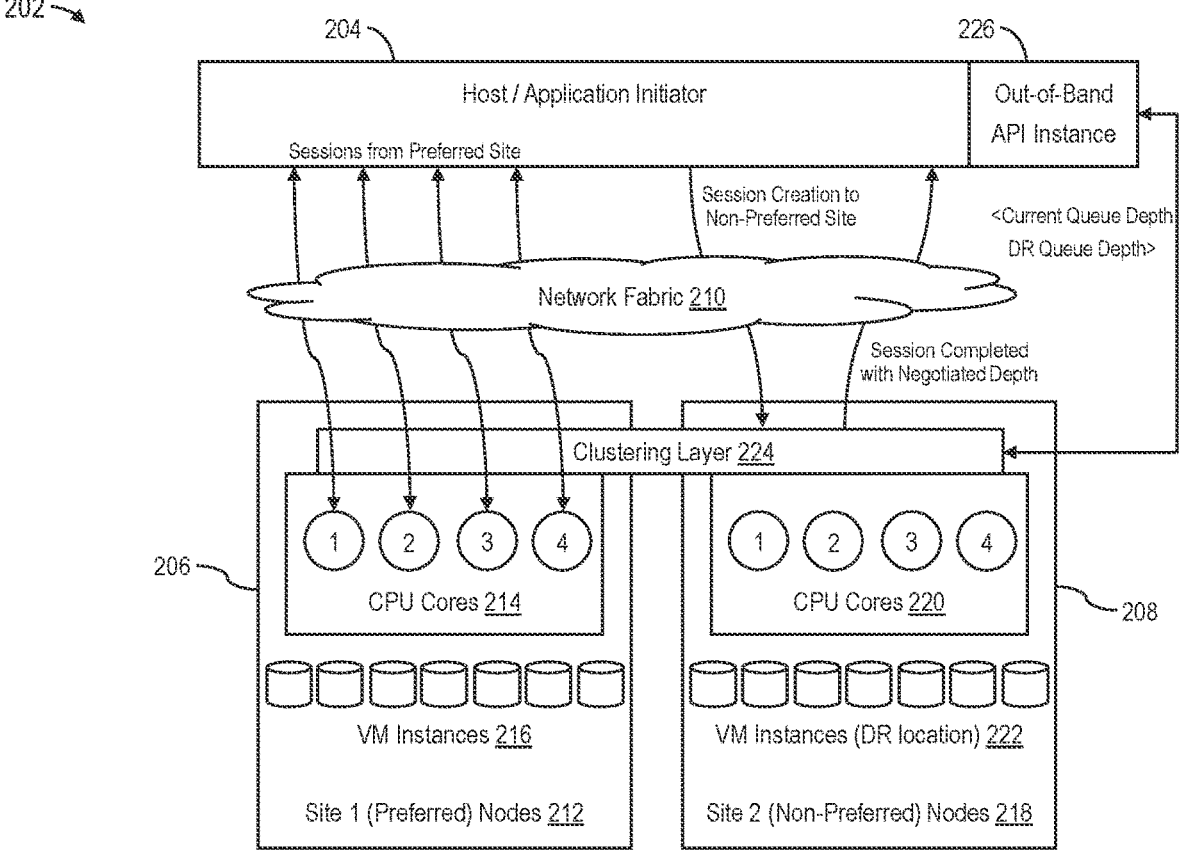
FIG. 2 depicts a block diagram illustrating dynamic queue depth allocation in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

Most cloud computing and cloud storage systems provide some mechanism for data redundancy, for example, a multi-site solution that offers multiple replicated data copies across the sites. These multi-site systems typically provision back-up copies of all customer data to prevent a loss of such data. To further protect customer data, some cloud storage systems extend the practice of making back-up copies to provide disaster recovery. In cloud systems offering disaster recovery, a back-up copy of the customer data is kept at a site remote from the primary storage location. If a disaster strikes the primary storage location, the customer data can be recovered from the back-up copies located at the remote site. The back-up copy is kept in sync with the primary copy, which is used by Hosts/applications for input/output (IO) operations, using a synchronous copy scheme. Synchronous copy involves sending primary data to the secondary location and confirming the reception of such data before completing the current IO operation at the primary location. That is, a subsequent IO operation at the primary site cannot start until the primary data has been successfully copied, with confirmation, to the secondary virtual disk copy.

One type of multi-site solution is the so-called stretched cluster system. In a stretched cluster system, half nodes in a storage cluster are physically separated by the distance between the two (or more) respective locations of the partial nodes. A copy of the volume is stored at each location. Advantageously, when experiencing a loss of the storage area network (SAN) and/or power at one location, access to the disk data remains available at the alternate location. Notably, using stretched cluster system in this manner requires clustering software at the application and server layer to fail over to a server at the alternate location and to resume access to the disks. In some stretched cluster solutions, both copies of the storage are kept synchronized, and the cache is mirrored between both nodes. Therefore, the loss of one location causes no disruption to the alternate location.

Queue depth is the number of READ/WRITE IO requests (SCSI commands) that can be queued at one time on a target system. Each IO command request from an initiator (e.g., a host or application) to the target consumes a queue entry. Typically, a higher queue depth equates to better performance. However, if the target controller's maximum queue depth is reached, that target rejects all further incoming commands by returning a queue full response (e.g., QFULL) to later initiators. If a large number of applications (initiators) are accessing a target controller, QFULL conditions can significantly degrade system performance and can lead to errors.

In a configuration having multiple host initiators, all hosts should have similar queue depths. An inequality in queue depth allocation between hosts connected to a storage controller through the same target port can result in hosts with smaller queue depths being deprived of access to resources by hosts with larger queue depths.

In the case of ethernet based connections between initiators and target devices (for example, over internet Small Computer Systems Interface (iSCSI) or Non-Volatile Memory express (NVMe) over the Transmission Control Protocol (TCP)/RDMA over Converged Ethernet (RoCE)/internet Wide-Area RDMA Protocol (iWARP) protocols), when a connection is established between an initiator and target systems, the endpoints will negotiate on the queue depth and a decision of queue depth is required for negotiation finalization. Generally, this queue depth is designated on a per connection basis (per session queue depth allocation).

Initiators generally create more than one session to a target device to avail the benefits of high availability and disaster recovery features offered by the networking and target systems. For example, consider a typical scenario where one application has created 4 sessions between initiator and target to access a remote volume via multiple network paths (e.g., to different target nodes of a same controller). In that case, the target system will allocate the X queue depth to every session, where X is the negotiated queue depth. The total queue depth count becomes 4X, from which the target Logical Unit Number (LUN) (i.e., volume storage, also referred to as disk) can be accessed by the initiator system. Continuing with this example, when the disk is accessible via 4 paths (sessions) and queue depth is set to 4, the multipathing will look like the below example pseudocode:

```
mpatha (36005076802850bd97000000000000000) dm-3 IBM,2145 >>
Contributing Queue depth = 16
size=33T features='1 queue_if_no_path' hwhandler='1 alua' wp=rw
|+ policy='service-time 0' prio=10 status=enabled
||- 4:0:1:0 sdd 8:48 active ready running >>>> Session Queue depth = 4
|'- 6:0:0:0 sdc 8:32 active ready running >>>> Session Queue depth = 4
'+ policy='service-time 0' prio=50 status=active
'- 7:0:1:0 sdb 8:16 active ready running >>>> Session Queue depth = 4
'- 7:0:1:0 sda 8:17 active ready running >>>> Session Queue depth = 4
```

Observe that, while multiple sessions are established from the initiator device to the target services, only one of the paths are used for data transmission generally. This path is referred to as the "preferred path" and/or "active path" in the multipathing domain. The active path is the path where most of the IO workload and commands are sent/received which are in agreement with initiator and target parties. The other paths are not used until the "preferred path" is detected as FAILED/FAULTY (i.e., in essence, the other paths provide backup and/or contingences for preferred path failure). This arrangement supports cache building at the target and offers additional performance benefits.

When multiple sessions exist between initiator and target entities, queue depth is allocated to every session irrespective of whether each path is a preferred or non-preferred path in the system. Accordingly, when there are 4 paths listed to a target disk, the designated queue depth is allocated to all 4 paths. The total storage controller level queue depth is dependent on how much command buffer is available at the target and queue depths are assigned accordingly. Note that every session consumes some amount of target command buffer equal to the queue depth of the session.

In the case of disaster recovery solutions like the stretched cluster, there are two (or more) sites to which the initiator has made a connection. The preferred path goes to the primary site (e.g., site 1), which performs all READ/WRITE workload until failure. The paths to the one or more backup sites (e.g., site 2, site 3, etc.) are used only in case of a site 1 failure situation which, by definition, is rare scenario. Since the session(s) to the secondary site(s) are present all the time, a secondary site keeps consuming command buffer, even when there are no active IO operations running on the secondary site. The queue depth allocated to these sessions are wasteful and cannot be used for other sessions because of their exclusive access to the command buffer pool. This type of configuration, while common, limits the performance of the hosts/applications which are actively working on the secondary site (e.g., the secondary site may be a primary site from the perspective of some other initiator). Even if the command buffer is not utilized, the command buffer cannot be used to increase performance (e.g., by the applications for burst workloads).

One or more embodiments of the present invention address one or more of the above-described shortcomings by providing computer-implemented methods, computing systems, and computer program products that optimally and dynamically allocates device queue depth among a plurality of initiated sessions in a multi-site target system depending on their activeness for a workload. Configuring a multi-site system with a dynamic connection queue depth in accordance with one or more embodiments increases system performance, for example, the ability to process networked SCSI commands for read/write workloads.

In some embodiments, two instances are configured, with one process running in a target controller and another process running in an initiator system. The instance at the target controller is configured with an understanding of the respective multi-site architecture. For example, information about primary and auxiliary sites can be collected from a cluster state machine and maintained in a process metadata (using, e.g., a state change notification (SCN)/response state change notification (RSCN) approach). Information about volumes, host objects, and their site preferences can be located in the metadata (e.g., via mapper classes), which are used to dynamically allocate queue depth from the target.

In some embodiments, when any session creation request is received by a target system, the target system driver (controller) firstly validates the authentication policies (e.g., Challenge-Handshake Authentication Protocol (CHAP) information and the application identifier at the target). If the application identifier and CHAP details are matching with the target system records, then a session parameter negotiation will be performed.

During session parameter negotiation, a queue depth allocator is invoked that determines a site preference for the initiator identifier objects (application and host objects) from the process metadata mapper classes. The received information is mapped with node agent details to determine which node(s) has received the session creation request. When a session creation is attempted on a non-preferred site of the host/application, the queue depth allocator is configured to understand that the created path will be used only in case of a disaster recovery situation (a rare event).

In some embodiments, the queue depth allocator directs the target system to allocate only a minimum value of queue depth to the session, leveraging the fact that this path will not be used as a preferred path for workload during normal cases. In some embodiments, in-band and/or out-of-band communication Application Programming Interfaces (APIs) are invoked to send these instructions and queue depth information to the target system. In some embodiments, the message from the queue depth allocator includes two field tuples (e.g., <current queue depth, disaster recovery queue depth>). In some embodiments, the queue depth information is passed to the initiator.

Upon receiving the queue depth information, the initiator will store this data in a local metadata storage to be used when/if the primary path site fails. Meanwhile, the target will allocate the minimum queue depth as directed, freeing an unallocated portion of the queue depth for other sessions (e.g., sessions demanding increased queue depth to increase performance).

When the primary path is detected as FAILED/FAULTY by the initiator process, then the initiator is configured to send a special message to the target indicating the restoration of the disaster recovery queue depth to the respective sessions (using, e.g., session identifiers (CID)). In response, the queue depth to the targeted session will be restored, allowing the host or application to continue with usual IO command operations on other paths.

When the primary path comes back online, then a reversal procedure can be executed to free up the (now redundant) queue depth at the secondary site. The freed up queue depth (command buffer) can be maintained as a separate record which can used by the queue depth allocator to allocate additional queue depth to session(s) having a primary path on a respective node(s).

In some embodiments, a flexible pool of additional queue depth (freed due to the use of the minimal disaster recovery queue depth) is managed separately from the bulk, current queue depth, as there can be no guarantee that the freed queue depth will be available at any given time—at any point, any portion of the freed queue depth may be recovered due to an outage at the primary site. Hence, the pool of additional queue depth can be allocated on-demand to other sessions for burst workloads to improve performance. The result is an optimized command pool utilization for networked packet workload commands and improved IO performance. At minimum, more outstanding commands can be allocated at the target.

Multi-site systems configured with dynamic queue depths in accordance with one or more embodiments offer several technical advantages over prior solutions. In particular, a base system-wide performance boost will be realized due to the efficient resource allocation at initiator and target systems. Moreover, since the queue depth (target command pool) is utilized more optimally and additional depth is made available for burst traffic, worked performance can be improved dramatically without increasing target resources (i.e., at the same amount of target resources). Dynamically allocating queue depth also mitigates the need to return a queue full response (e.g., QFULL) to later initiators, as active sessions are allocated additional queue depth. Relatedly, this arrangement avoids command window closures, ensures a more seamless flow between endpoints, and avoids latency glitches for application workloads. Other advantages are possible.

In particular, configuring an existing multi-site system to leverage dynamic queue depths can be done relatively easily, without extraordinary hardware and software requirements. In short, multi-site systems can be mostly updated using current edge computing system architecture without significant downtime; and thus, can serve as a real time problem solution for real time device data transfers.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as queue depth allocator 200 (also referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Referring now to FIG. 2, a block diagram for implementing a dynamic queue depth in a multi-site system is shown in accordance with one or more embodiments of the present invention. In some embodiments, a multi-site system 202 includes an initiator 204 (e.g., a host and/or application), one or more preferred sites 206, and one or more non-preferred sites 208. In some embodiments, the initiator 204 communicates with the sites 206, 208 over a network fabric 210.

In some embodiments, each of the one or more preferred sites 206 includes a plurality of preferred nodes 212 (as shown, the "Site 1 (Preferred) Nodes") operating a plurality of CPU cores 214 (as shown, the four nodes "1", "2", "3", and "4") over a plurality of virtual machine (VM) instances 216. Similarly, each of the one or more non-preferred sites 208 includes a plurality of non-preferred nodes 218 (as shown, the "Site 2 (Non-Preferred) Nodes") operating a plurality of CPU cores 220 (as shown, the four nodes "1", "2", "3", and "4") over a plurality of virtual machine (VM) instances 222.

In some embodiments, the multi-site system 202 is configured as a stretched cluster distributed over the one or more preferred sites 206 and the one or more non-preferred sites 208. In some embodiments, a clustering layer 224 manages resource allocations of the stretched cluster (e.g., workload assignments to the sites 206, 208) over the network fabric 210. In some embodiments, the initiator 204 includes an out-of-band API instance 226 configured to interface with the clustering layer 224 over the network fabric 210.

In some embodiments, the multi-site system 202 includes a queue depth allocator 200 (refer FIG. 1). In some embodiments, the queue depth allocator 200 can be implemented by (in whole or in part) one or more processors (e.g., the computing environment 100 of FIG. 1). In some embodiments, the queue depth allocator 200 can be implemented within any or all of the initiator 204, clustering layer 224, preferred nodes 212, non-preferred nodes 218, and/or out-of-band API instance 226.

Illustrative Example—Implementing a Dynamic
Queue Depth

An example implementation of a dynamic queue depth within the multi-site system 202 is as follows. Note that, in practice, some or all of the steps can occur concurrently. Moreover, each step can include any number of sub steps, which themselves can occur successively and/or currently.

STEP 1: The initiator 204 initiates and loads available metadata, including session information, target details, etc. In some embodiments, the initiator 204 includes a controller (an initiator controller, not separately shown) configured to run a process (referred to herein as an initiator process) to self-initialize and to load the metadata. The metadata is not meant to be particularly limited, but can include both user and system supplied data responsive to the configuration of a stretched cluster (e.g., the one or more preferred sites 206 and the one or more non-preferred sites 208 of the multi-site system 202). In some embodiments, the initiator 204 loads CHAP data for a session authentication and target connectivity details. In some embodiments, the initiator 204 initializes a data structure which will be used to maintain a current queue depth enumerator and a disaster recovery queue depth enumerator.

STEP 2: A target system (e.g., the one or more preferred sites 206 and the one or more non-preferred sites 208 of the multi-site system 202) initiates and loads the available metadata. In some embodiments, the target system includes a controller (a target controller, not separately shown) configured to run a process (referred to herein as a target process) to self-initialize and to load the metadata. In some embodiments, the metadata is loaded from a cluster state machine (not separately shown). In some embodiments, the target process gathers metadata for site information for the nodes (e.g., the plurality of preferred nodes 212 and the plurality of non-preferred nodes 218) and host (e.g., initiator 204) object policies. In some embodiments, a mapping of an initiator identifier for the initiator 204 and the site preferences is created and saved in a local data structure. In some embodiments, an SCN/RSCN can be polled by the target system to make any necessary changes in the data structure and site preferences. In some embodiments, metadata about volumes, host objects, and site preferences are created and located in a metadata mapper class(es). In some embodiments, the metadata mapper classes are used to allocate queue depth from the target system.

STEP 3: A session creation request (e.g., SESSION_CREATE) is received by the target system. In some embodiments, the session creation request is communicated over the network fabric 210 from the initiator 204. Responsive to the session creation request, the target controller and/or target process locates any local authentication policies, such as CHAP information and application identifiers in the local data structure. If the application identifier and CHAP details within the session creation request match with the local data structure records, then a session parameter negotiation can be invoked.

STEP 4: During the session parameter negotiation the queue depth allocator 200 (refer FIG. 1) is invoked, which then determines the site preferences for the application identifier objects (host objects of the initiator 204) from the metadata mapper classes. In some embodiments, the received information can be mapped to a node agent. In some embodiments, an acknowledgment that a node (e.g., one of the preferred nodes 212 or one of the non-preferred nodes 218) has received the session creation request can be generated and transmitted over the network fabric 210.

STEP 5: When the session creation request is directed to a non-preferred site (e.g., the one or more non-preferred sites 208) of the host/application (e.g., initiator 204), the queue depth allocator 200 can make one or more dynamic queue depth optimization decisions. In some embodiments, the queue depth allocator 200 will determine a minimum queue depth. In some embodiments, the minimum queue depth is defined in a policy (e.g., for a configuration parser).

In some embodiments, the out-of-band API instance 226 is invoked to create and/or send a queue depth configuration message to the target system over the network fabric 210. In some embodiments, the queue depth configuration message includes two field tuples (e.g., <current queue depth, disaster recovery queue depth>). In some embodiments, the queue depth configuration message is passed to the initiator 204 for transmission.

STEP 6: Upon receiving the queue depth configuration message, the initiator 204 can save this data in a local metadata storage. In some embodiments, the queue depth configuration message can be used by the initiator 204 at a later time when (if) the primary path site fails (e.g., failure of any of the one or more preferred sites 206 having an active session).

In some embodiments, the queue depth configuration message is transmitted to the target system (via the initiator 204 and/or the out-of-band API instance 226), and responsive to receiving the queue depth configuration message, the target system allocates a minimum value of queue depth (as defined, for example, by the two field tuples <current queue depth, disaster recovery queue depth>, itself set by the queue depth policy), leveraging the fact that the identified path is a non-preferred path for workload during normal cases.

Continuing with the earlier example, the queue depth configuration message can set a minimum queue depth of 1

(or 2, 3, 10, etc.). The multipathing after receiving the queue depth configuration message will look like the below example pseudocode:

```
mpatha (36005076802850bd97000000000000000) dm-3 IBM,2145 >>
Contributing Queue depth = 7
size=33T features='1 queue_if_no_path' hwhandler='1 alua' wp=rw
|+ policy='service-time 0' prio=10 status=enabled
||- 4:0:1:0 sdd 8:48 active ready running >>>> Session Queue depth = 4
|'- 6:0:0:0 sdc 8:32 active ready running >>>> Session Queue depth = 1
'+ policy='service-time 0' prio=50 status=active
'- 7:0:1:0 sdb 8:16 active ready running >>>> Session Queue depth = 1
'- 7:0:1:0 sda 8:17 active ready running >>>> Session Queue depth = 1
```

Observe that the "Contributing Queue depth" is now 7 and that the "Session Queue depth" for the three non-preferred paths is now 1, leaving 9 queue depth for dynamic allocation (from an initial pool of 16 in the working example).

Illustrative Example—Queue Depth Recovery after Primary Site Failure

Note that the multi-site system 202 is now operating the plurality of preferred nodes 212 and the plurality of non-preferred nodes 218 according to the dynamic queue depth scheme described in STEPS 1 to 6. In some embodiments, the multi-site system 202 will continue operating in this manner until a primary site failure occurs.

Figure 3:
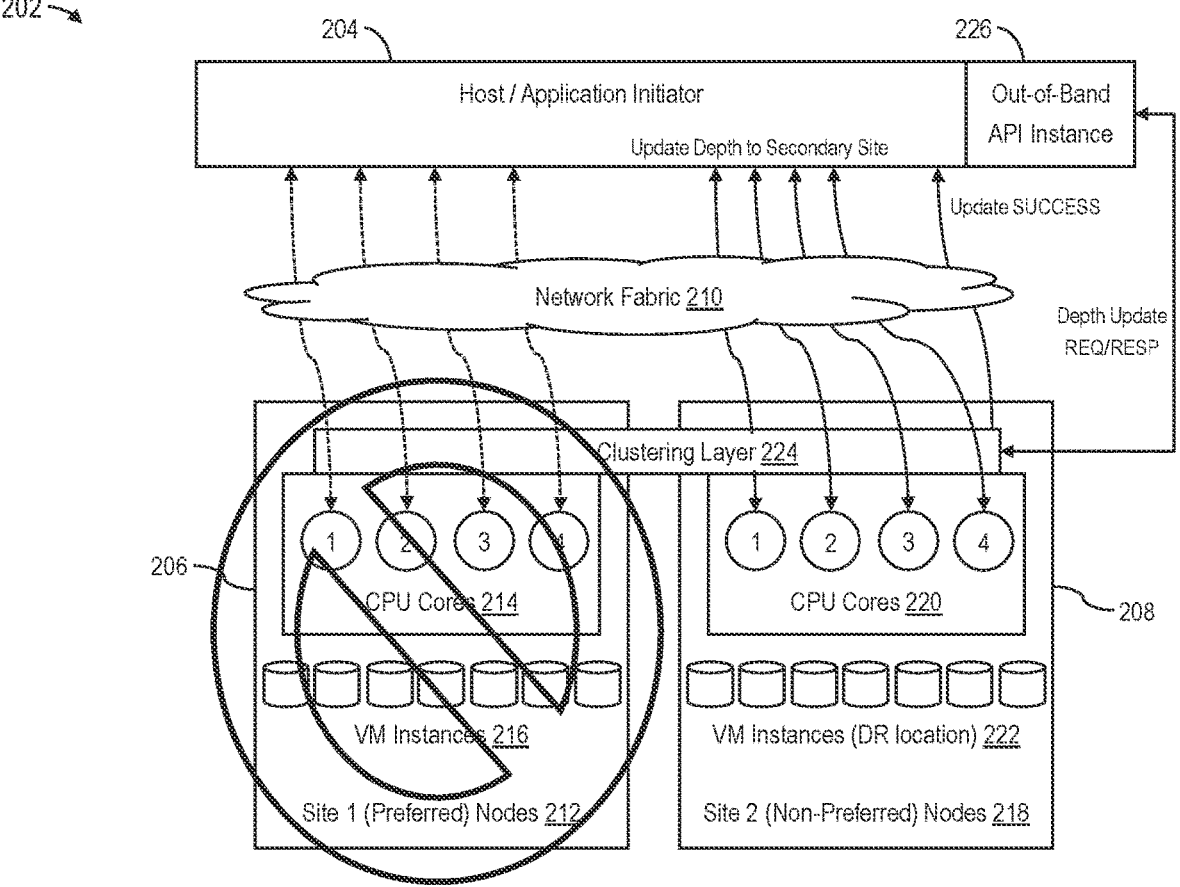
FIG. 3 depicts a block diagram illustrating dynamic queue depth recovery after primary site failure in accordance with one or more embodiments of the present invention.

FIG. 3 depicts a block diagram illustrating dynamic queue depth recovery after primary site failure in accordance with one or more embodiments of the present invention. As shown in FIG. 3, the one or more preferred sites 206 have experienced a failure (indicated by the circle-backslash symbol). As further shown in FIG. 3, the multi-site system 202 is configured to recover some or all of the queue depth previously freed from the non-preferred paths so that the non-preferred sites 208 (now taking over for the preferred sites 206) can fully operate. If a primary site failure is detected, a Queue Depth Recovery process is initiated, as described below with respect to STEPS 7 to 10.

STEP 7: Failure condition is detected and queue depth recovery is initiated. In some embodiments, one or more primary paths are detected as FAILED/FAULTY by the initiator 204 (e.g., by the initiator process). In some embodiments, the initiator 204 will send a primary site failure message to the target system indicating restoration of the disaster recovery queue depth to the non-preferred sessions. In some embodiments, the primary site failure message includes an identifier, such as a session CID, for the non-preferred sessions.

In some embodiments, in response to receiving the primary site failure message, the target system will restore queue depth to the targeted session so that the initiator 204 can continue with usual IO command operations on the other, backup paths (i.e., the non-preferred paths). Continuing with the earlier example, the multipathing after receiving the primary site failure message will look like the below example pseudocode:

```
mpatha (36005076802850bd97000000000000000) dm-3 IBM,2145 >>
Contributing Queue depth = 16
size=33T features='1 queue_if_no_path' hwhandler='1 alua' wp=rw
|+ policy='service-time 0' prio=10 status=enabled
||- 4:0:1:0 sdd 8:48 FAILED/FAULTY >>>> Session Queue depth = 4
|'- 6:0:0:0 sdc 8:32 FAILED/FAULTY >>>> Session Queue depth = 1
```

-continued

```
'+ policy='service-time 0' prio=50 status=active
'- 7:0:1:0 sdb 8:16 active ready running >>>> Session Queue depth = 4
'- 7:0:1:0 sda 8:17 active ready running >>>> Session Queue depth = 1
```

Observe that the "Contributing Queue depth" is back to 16 and that the "Session Queue depth" for one of the non-preferred paths (i.e., the temporary backup path) is now 4, allowing the target system to continue with usual IO command operations. The multi-site system 202 can continue operating in this manner until the primary site failure has been addressed.

STEP 8: When the primary path(s) come back online (i.e., when the one or more preferred sites 206 are again operational), a reversal procedure can be executed to free up the recovered queue depth at the secondary site (i.e., the temporary backup path of the one or more non-preferred sites 208). For example, the "Session Queue depth" for the temporary backup path can be reverted back to 1 (from 4).

STEP 9: In some embodiments, the freed up queue depth (command buffer) can be maintained as separate buffer from the remaining, bulk portion of the total queue depth. In some embodiments, the freed up queue depth can used to allocate more target command buffer to the session(s) having a primary path on a respective node (e.g., one or more of the plurality of preferred nodes 212). In some embodiments, the freed up queue depth can be dynamically allocated by the multi-site system 202 (e.g., by the queue depth allocator 200) using an on-demand basis to any number of other sessions. For example, a portion (some of all) of the freed up queue depth can be allocated to a session experiencing a burst workload to improve performance.

STEP 10: The dynamic queue depth operation is marked as COMPLETE. In some embodiments, the multi-site system 202 returns to operating the plurality of preferred nodes 212 and the plurality of non-preferred nodes 218 according to the dynamic queue depth scheme described in STEPS 1 to 6.

Referring now to FIG. 4, a flowchart 400 for implementing a dynamic queue depth in a multi-site system is generally shown according to an embodiment. The flowchart 400 is described in reference to FIGS. 1-3 and may include additional blocks not depicted in FIG. 4. Although depicted in a particular order, the blocks depicted in FIG. 4 can be rearranged, subdivided, and/or combined.

At block 402, an initiator of a multi-site system is initiated. In some embodiments, initiating the initiator includes loading CHAP information and an application identifier for the target system. In some embodiments, initiating the initiator further includes initializing a data structure to maintain a current queue depth enumerator and a disaster recovery queue depth enumerator.

At block 404, a target system of the multi-site system is initiated. In some embodiments, the target system includes a preferred site and a non-preferred site. In some embodiments, initiating the target system includes storing a mapping between an identifier of the initiator and one or more site preferences for the initiator in a local data structure.

At block 406, the target system receives a session creation request from the initiator. In some embodiments, the session creation request targets the non-preferred site.

At block 408, in response to the session creation request targeting the non-preferred site, a queue depth allocator of the multi-site system allocates only a minimum queue depth to a path between the initiator and the non-preferred site. In some embodiments, the minimum queue depth is defined in a queue depth policy of the multi-site system. In some embodiments, allocating the minimum queue depth includes invoking an out-of-band communication API to provide a two field tuple to the initiator. In some embodiments, the two field tuple includes a current queue depth and a disaster recovery queue depth.

In some embodiments, in response to a failure of the preferred site, the queue depth allocator restores the path between the initiator and the non-preferred site to a disaster recovery queue depth higher than the minimum queue depth.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   initiating an initiator of a multi-site system;
   initiating a target system of the multi-site system, the target system comprising a preferred site and a non-preferred site;
   receiving, by the target system, a session creation request from the initiator, the session creation request targeting the non-preferred site; and
   in response to the session creation request targeting the non-preferred site, allocating, by a queue depth allocator of the multi-site system, a minimum queue depth to a path between the initiator and the non-preferred site.

2. The computer-implemented method of claim 1, wherein initiating the initiator comprises loading Challenge-Handshake Authentication Protocol (CHAP) information and an application identifier for the target system.

3. The computer-implemented method of claim 2, wherein initiating the initiator further comprises initializing a data structure to maintain a current queue depth enumerator and a disaster recovery queue depth enumerator.

4. The computer-implemented method of claim 1, wherein initiating the target system comprises storing a mapping between an identifier of the initiator and one or more site preferences for the initiator in a local data structure.

5. The computer-implemented method of claim 1, further comprising defining the minimum queue depth in a queue depth policy of the multi-site system.

6. The computer-implemented method of claim 1, wherein allocating the minimum queue depth comprises invoking an out-of-band communication Application Programming Interface (API) to provide a two field tuple to the initiator, the two field tuple comprising a current queue depth and a disaster recovery queue depth.

7. The computer-implemented method of claim 1, further comprising, in response to a failure of the preferred site, restoring, by the queue depth allocator, the path between the initiator and the non-preferred site to a disaster recovery queue depth higher than the minimum queue depth.

8. A system having a memory, computer readable instructions, and one or more processors for executing the computer readable instructions, the computer readable instructions controlling the one or more processors to perform operations comprising:

initiating an initiator of a multi-site system;

initiating a target system of the multi-site system, the target system comprising a preferred site and a non-preferred site;

receiving, by the target system, a session creation request from the initiator, the session creation request targeting the non-preferred site; and in response to the session creation request targeting the non-preferred site, allocating, by a queue depth allocator of the multi-site system, a minimum queue depth to a path between the initiator and the non-preferred site.

9. The system of claim 8, wherein initiating the initiator comprises loading Challenge-Handshake Authentication Protocol (CHAP) information and an application identifier for the target system.

10. The system of claim 9, wherein initiating the initiator further comprises initializing a data structure to maintain a current queue depth enumerator and a disaster recovery queue depth enumerator.

11. The system of claim 8, wherein initiating the target system comprises storing a mapping between an identifier of the initiator and one or more site preferences for the initiator in a local data structure.

12. The system of claim 8, further comprising defining the minimum queue depth in a queue depth policy of the multi-site system.

13. The system of claim 8, wherein allocating the minimum queue depth comprises invoking an out-of-band communication Application Programming Interface (API) to provide a two field tuple to the initiator, the two field tuple comprising a current queue depth and a disaster recovery queue depth.

14. The system of claim 8, further comprising, in response to a failure of the preferred site, restoring, by the queue depth allocator, the path between the initiator and the non-preferred site to a disaster recovery queue depth higher than the minimum queue depth.

15. A computer program product comprising a computer readable storage medium having program instructions embodied therewith, the program instructions executable by one or more processors to cause the one or more processors to perform operations comprising:

initiating an initiator of a multi-site system;

initiating a target system of the multi-site system, the target system comprising a preferred site and a non-preferred site;

receiving, by the target system, a session creation request from the initiator, the session creation request targeting the non-preferred site; and in response to the session creation request targeting the non-preferred site, allocating, by a queue depth allocator of the multi-site system, a minimum queue depth to a path between the initiator and the non-preferred site.

16. The computer program product of claim 15, wherein initiating the initiator comprises loading Challenge-Handshake Authentication Protocol (CHAP) information and an application identifier for the target system.

17. The computer program product of claim 16, wherein initiating the initiator further comprises initializing a data structure to maintain a current queue depth enumerator and a disaster recovery queue depth enumerator.

18. The computer program product of claim 15, wherein initiating the target system comprises storing a mapping between an identifier of the initiator and one or more site preferences for the initiator in a local data structure.

19. The computer program product of claim 15, further comprising defining the minimum queue depth in a queue depth policy of the multi-site system.

20. The computer program product of claim 15, wherein allocating the minimum queue depth comprises invoking an out-of-band communication Application Programming Interface (API) to provide a two field tuple to the initiator, the two field tuple comprising a current queue depth and a disaster recovery queue depth.

\* \* \* \* \*